(12) United States Patent
Wang et al.

(10) Patent No.: US 9,602,254 B2
(45) Date of Patent: Mar. 21, 2017

(54) COMPONENT CARRIER ALLOCATION METHOD AND DEVICE, AND COMPUTER STORAGE MEDIUM WITH IMPROVED COMMUNICATION QUALITY OF UE MOVING AT HIGH SPEED IN CELL

(71) Applicant: ZTE Corporation, Shenzhen, Guangdong (CN)

(72) Inventors: Man Wang, Shenzhen (CN); Wancheng Ge, Shenzhen (CN); Renzhou Gui, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/890,916

(22) PCT Filed: Nov. 28, 2013

(86) PCT No.: PCT/CN2013/087997
§ 371 (c)(1),
(2) Date: Dec. 4, 2015

(87) PCT Pub. No.: WO2014/183416
PCT Pub. Date: Nov. 20, 2014

(65) Prior Publication Data
US 2016/0119091 A1    Apr. 28, 2016

(30) Foreign Application Priority Data
May 15, 2013    (CN) .......................... 2013 1 0179005

(51) Int. Cl.
*H04L 12/28*    (2006.01)
*H04L 5/00*    (2006.01)

(52) U.S. Cl.
CPC ............ *H04L 5/001* (2013.01); *H04L 5/0037* (2013.01); *H04L 5/0071* (2013.01)

(58) Field of Classification Search
CPC ..... H04L 5/001; H04L 5/0037; H04L 5/0071; H04B 7/2634; H04B 7/18539;
(Continued)

(56) References Cited

U.S. PATENT DOCUMENTS 5,758,090 A * 5/1998 Doner ................... H04W 16/00
370/335
2012/0099466 A1* 4/2012 Aoyama ................. H04L 5/001
370/252

(Continued)

FOREIGN PATENT DOCUMENTS

CN    102186250 A    9/2011
CN    102550109 A    7/2012
(Continued)

OTHER PUBLICATIONS

Supplementary European Search Report in European application No. 13884519.3, mailed on Mar. 23, 2016.
(Continued)

*Primary Examiner* — Maharishi Khirodhar
(74) *Attorney, Agent, or Firm* — Oppedahl Patent Law Firm LLC

(57) ABSTRACT

Disclosed are a method, device, and a computer storage medium for component carrier allocation. The method includes that when it is determined that a component carrier which has a frequency exceeding a preset threshold exists in component carriers which are available to be allocated currently in a cell, a FDM of UE in the cell is updated according to the coverage of the component carrier which has a frequency exceeding the preset threshold; and frequency domain priority is determined according to the updated FDM, and the component carrier which has a frequency exceeding the preset threshold is allocated for the UE in the cell according to the frequency domain priority.

17 Claims, 2 Drawing Sheets

(58) Field of Classification Search
CPC ..... H04W 16/14; H04W 16/10; H04W 16/02; H04W 16/24; H04W 72/0453; H04W 72/04
See application file for complete search history.

(56) References Cited

U.S. PATENT DOCUMENTS

2012/0147844 A1   6/2012   Kim
2013/0034018 A1   2/2013   Wei
2015/0131581 A1   5/2015   Wei

FOREIGN PATENT DOCUMENTS

EP   2448322 A1   5/2012
EP   2466947 A1   6/2012
EP   2469952 A2   6/2012

OTHER PUBLICATIONS

International Search Report in international application No. PCT/CN2013/087997, mailed on Feb. 27, 2014.
English Translation of the Written Opinion of the International Search Authority in international application No. PCT/CN2013/087997, mailed on Feb. 27, 2014.

* cited by examiner

COMPONENT CARRIER ALLOCATION METHOD AND DEVICE, AND COMPUTER STORAGE MEDIUM WITH IMPROVED COMMUNICATION QUALITY OF UE MOVING AT HIGH SPEED IN CELL

CROSS-REFERENCE TO RELATED APPLICATIONS

This application is filed based upon and claims priority to Chinese Patent Application No. 201310179005.0, filed on May 15, 2013, the entire contents of which are incorporated herein by reference.

TECHNICAL FIELD

The present disclosure relates to a communication technology, and in particular to a method, device, and a computer storage medium for component carrier allocation.

BACKGROUND

With the rapid development of high speed railway and expressway, a future mobile communication system faces more and more high-speed moving environments, which require the communication system to support a higher moving speed. Correspondingly, Long Term Evolution (LTE) optimizes a low-speed moving scenario of 0~15 km/h for User Equipment (UE), ensures that the high performance of the communication system can be achieved for the UE in a high-speed moving scenario of 15~120 km/h, and ensures that the mobility of a cellular network can be kept for the UE in a high-speed moving scenario of 120~350 km/h (even 500 km/h is supported in some frequency bands).

For meeting a system bandwidth requirement of 100 MHz of the International Mobile Telecommunications-Advanced (IMT-Advanced), the 3rd Generation Partnership Project (3GPP) LTE Release 10 introduces a Carrier Aggregation (CA) technology. Wireless transmission characteristics, such as wireless propagation path loss and Doppler frequency shift, of different component carriers are different, and a proportional fair allocation policy exists, therefore, when a component carrier is allocated for UEs in the cell, the component carrier is always preferentially allocated for the UE which has high throughput and moves at a low speed in the cell, which causes the poor communication quality of the UE which has a low throughput and moves at a high speed, thereby affecting the user experience.

SUMMARY

In view of this, the present disclosure provides a method, device, and a computer storage medium for component carrier allocation, for at least solving the problem of poor communication quality of UE moving at a high speed in a cell caused by the low fairness of component carrier allocation in the cell.

To this end, the technical solutions of the present disclosure are implemented as follows.

A method for component carrier allocation is provided, which includes that:

when it is determined that a component carrier which has a frequency exceeding a preset threshold exists in component carriers which are available to be allocated currently in the cell, a Frequency Domain Metric (FDM) of the UE in the cell is updated according to coverage of the component carrier which has a frequency exceeding the preset threshold; and frequency domain priority is determined according to the updated FDM, and the component carrier which has a frequency exceeding the preset threshold is allocated for the UE in the cell according to the frequency domain priority.

Preferably, before it is determined that the component carrier which has a frequency exceeding the preset threshold exists in the component carriers which are available to be allocated currently in the cell, the method may further include that:

the FDM of the UE in the cell is determined as $$\left(1 + \frac{\sum_{m \in C_k} r_{k,m(t)}}{(T-1)R_k(t)}\right),$$

wherein $C_k$ is a component carrier set allocated for UE k, $R_k(t)$ is an average data transmission rate of the UE k before a time slot t, $r_{k,m}(t)$ is an instantaneous data transmission rate that the UE k reaches on an allocated component carrier m in the time slot t, and T is a measuring window size of an average throughput of the cell.

Preferably, updating the FDM of the UE in the cell according to the coverage of the component carrier which has a frequency exceeding the preset threshold may include that:

when a coverage radius of the component carrier which has a frequency exceeding the preset threshold is greater than or equal to a preset threshold $r_2$, FDM of UE which has a distance longer than a preset threshold $r_1$ and shorter than the preset threshold $r_2$ from a base station to which the cell belongs to a×$FDM_1$, and FDM of UE which has a distance longer than or equal to the preset threshold $r_2$ from the base station to which the cell belongs to b×$FDM_2$, wherein $FDM_1$ and $FDM_2$ are the FDM of the UEs before update, a is greater than 1, and b is greater than a;

when the coverage radius of the component carrier which has a frequency exceeding the preset threshold is shorter than the preset threshold $r_2$, FDM of UE which has a distance longer than the preset threshold $r_1$ and shorter than the preset threshold $r_2$ from the base station to which the cell belongs to a×$FDM_1$, and FDM of UE which has a distance longer than or equal to the preset threshold $r_2$ from the base station to which the cell belongs to 0, wherein a is greater than 1, and $FDM_1$ is the FDM of the UE before update.

Preferably, the method may further include that:

when it is determined that a component carrier which has a frequency not exceeding the preset threshold exists in the component carriers which are available to be allocated currently in the cell, frequency domain priority is determined according to the determined FDM $$\left(1 + \frac{\sum_{m \in C_k} r_{k,m(t)}}{(T-1)R_k(t)}\right)$$

of the UE, and the component carrier which has a frequency not exceeding the preset threshold is allocated for the UE in the cell according to the frequency domain priority.

Preferably, the method may further include that:

a preset number of component carriers in the component carriers which have frequencies exceeding the preset threshold are controlled to cover an area having a distance exceeding a preset threshold $r_2$ from the base station to which the cell belongs, and a preset number of component carriers in the component carriers which have frequencies exceeding the preset threshold are controlled to cover an area having a distance longer than the preset threshold $r_1$ and shorter than the preset threshold $r_2$ from the base station to which the cell belongs;

the component carrier which has a frequency not exceeding the preset threshold is controlled to cover an area having a distance shorter than or equal to the preset threshold $r_1$ from the base station to which the cell belongs.

A computer storage medium is also provided, which stores a computer program for executing the above method for component carriers allocation.

A device for component carrier allocation is also provided, which includes a first judging unit, an updating unit and an allocating unit; wherein the first judging unit is configured to judge whether the component carrier which has a frequency exceeding the preset threshold exists in the component carriers which are available to be allocated currently in the cell;

the updating unit is configured to, when a judging result of the first judging unit is yes, update a FDM of UE in the cell according to coverage of the component carrier which has a frequency exceeding the preset threshold; and the allocating unit is configured to determine frequency domain priority according to the FDM determined by the updating unit, and allocate the component carrier which has a frequency exceeding the preset threshold for the UE in the cell according to the frequency domain priority.

Preferably, the device may further include:

a determining unit, which is configured to, before the first judging unit judges whether the component carrier which has a frequency exceeding the preset threshold exists in the component carriers which are available to be allocated currently in the cell, determine the FDM of the UE in the cell as $$\left(1 + \frac{\sum_{m \in C_k} r_{k,m(t)}}{(T-1)R_k(t)}\right),$$

wherein $C_k$ is the component carrier set allocated for UE k, $R_k(t)$ is the average data transmission rate of the UE k before the time slot t, $r_{k,m}(t)$ is the instantaneous data transmission rate that the UE k reaches on an allocated component carrier m in the time slot t, and T is the measuring window size of the average throughput of the cell.

Preferably, the updating unit may be further configured to, when a coverage radius of the component carrier which has a frequency exceeding the preset threshold is greater than or equal to a preset threshold $r_2$, update FDM of UE which has a distance longer than the preset threshold $r_1$ and shorter than the preset threshold $r_2$ from a base station to which the cell belongs to a×$FDM_1$, and update FDM of UE which has a distance longer than or equal to the preset threshold $r_2$ from the base station to which the cell belongs to b×$FDM_2$, wherein $FDM_1$ and $FDM_2$ are the FDM of the UEs before update, a is greater than 1, and b is greater than a; and the updating unit may be further configured to, when the coverage radius of the component carrier which has a frequency exceeding the preset threshold is shorter than the preset threshold $r_2$, update FDM of UE which has a distance longer than the preset threshold $r_1$ and shorter than the preset threshold $r_2$ from the base station to which the cell belongs to a×$FDM_1$, and update FDM of UE which has a distance longer than or equal to the preset threshold $r_2$ from the base station to which the cell belongs to 0, wherein a is greater than 1, and $FDM_1$ is the FDM of the UE before update.

Preferably, the device may further include:

a second judging unit, which is configured to judge whether a component carrier which has a frequency not exceeding the preset threshold exists in the component carriers which are available to be allocated currently in the cell; and the allocating unit is further configured to, when a judging result of the second judging unit is yes, determine frequency domain priority according to the determined FDM $$\left(1 + \frac{\sum_{m \in C_k} r_{k,m(t)}}{(T-1)R_k(t)}\right)$$

of the UE, and allocate the component carrier which has a frequency not exceeding the preset threshold for the UE in the cell according to the frequency domain priority.

Preferably, the device may further include:

a controlling unit, which is configured to control a preset number of component carriers in the component carriers which have frequencies exceeding the preset threshold to cover the area having a distance exceeding the preset threshold $r_2$ from the base station to which the cell belongs, and control a preset number of component carriers in the component carriers which have frequencies exceeding the preset threshold to cover an area having a distance longer than the preset threshold $r_1$ and shorter than the preset threshold $r_2$ from the base station to which the cell belongs; and the controlling unit is further configured to control the component carriers which has a frequency not exceeding the preset threshold to cover the area having a distance shorter than or equal to the preset threshold $r_1$ from the base station to which the cell belongs.

In the technical solutions provided by the present disclosure, when it is determined that a component carrier which is available to be allocated currently in a cell is a component carrier which has a frequency exceeding a preset threshold, the FDM of UE in the cell is updated according to the coverage of the component carrier; when the UE moves at a high speed in an edge area and a middle area of the cell, the priority of the UE which has a distance longer than the preset threshold $r_1$ and shorter than the preset threshold $r_2$ from a base station to which the cell belongs can be boosted, and the priority of UE which has a distance exceeding the preset threshold $r_2$ from the base station to which the cell belongs can also be boosted, the fairness of component carrier allocation is ensured, and the data throughput of the UE moving at a high speed is improved, thereby ensuring the communication quality of the UE.

DETAILED DESCRIPTION

The present disclosure is further elaborated below in combination with the accompanying drawings and the specific embodiments.

Figure 1:
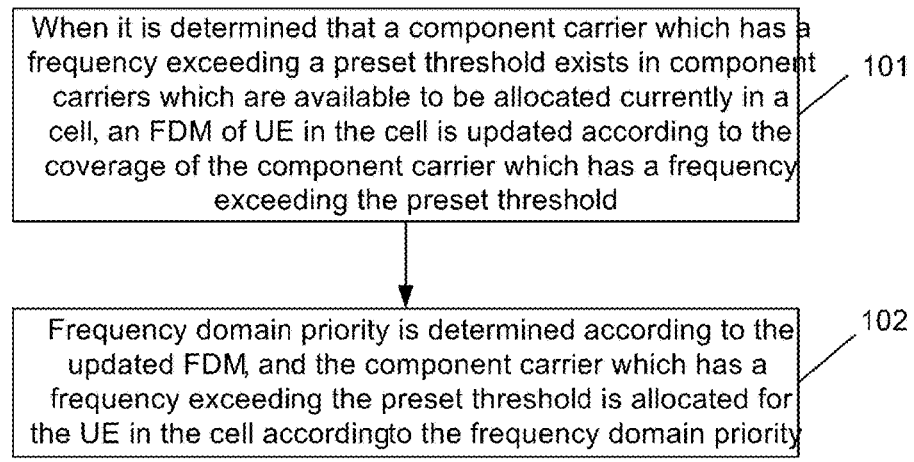
FIG. 1 is a flowchart of a method for component carrier allocation according to an embodiment of the present disclosure.

The present disclosure describes a method for component carrier allocation; FIG. 1 is a flowchart of the method for component carrier allocation according to an embodiment of the present disclosure; as shown in FIG. 1, the method includes the following steps.

Step 101 is that when it is determined that a component carrier which has a frequency exceeding the preset threshold exists in component carriers which are available to be allocated currently in a cell, the FDM of UE in the cell is updated according to the coverage of the component carrier which has a frequency exceeding the preset threshold.

Here, before Step 101, a Time Domain Metric (TDM) of the UE in the cell is determined as $$\frac{D(i, t)}{\overline{R}(i, t)}$$

according a proportional fair allocation policy, wherein $D(i,t)$ is a throughput which UE i reaches in a time slot t, $\overline{R}(i,t)$ is an average throughput of the UE i in t time slots; and the FDM of the UE in the cell is determined as $$\left(1 + \frac{\sum_{m \in C_k} r_{k,m(t)}}{(T-1)R_k(t)}\right)$$

according to the proportional fair allocation policy, wherein $C_k$ is a component carrier set allocated for the UE k, $R_k(t)$ is the average data transmission rate of the UE k before the time slot t, $r_{k,m}(t)$ is the instantaneous data transmission rate that the UE k reaches on an allocated component carrier m in the time slot t, and T is the measuring window size of the average throughput of the cell.

Figure 2:
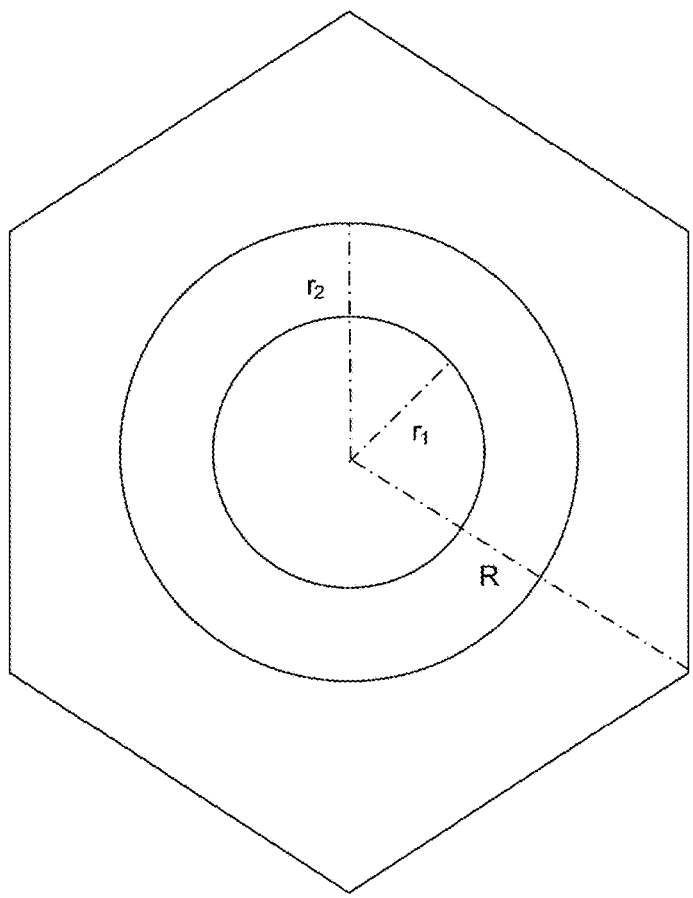
FIG. 2 is a distribution diagram of UEs in a cell according to an embodiment of the present disclosure.

FIG. 2 shows a distribution diagram of UEs in the cell according to an embodiment of the present disclosure; the UE having a distance not exceeding the preset threshold $r_1$ (values of $r_1$ and $r_2$ are preset according to a network arrangement situation and a network condition) from the base station to which the cell belongs is in a core area of the cell, the UE having a distance longer than the preset threshold $r_1$ and shorter than the preset threshold $r_2$ from the base station to which the cell belongs is in the middle area of the cell, and the UE having a distance longer than or equal to the preset threshold $r_2$ from the base station to which the cell belongs is in the edge area of the cell; the Signal-to-Noise Ratio (SNR) on resource blocks of the component carriers which are allocated when the UE in the edge area of the cell and the UE in the middle area of the cell move at a high speed (namely the speed per hour is 15 km/h or above) is relatively low, and the instantaneous data transmission rate $r_{k,m}(t)$ of the UEs is relatively low, thereby the FDM of the UEs is relatively small; the proportional fair allocation policy determines the frequency domain priority according to the FDM, and allocates a component carrier for UE according to the frequency domain priority, so fewer component carriers are allocated when the UE in the edge area of the cell and the UE in the middle area of the cell move at a high speed, which causes their data throughput to be obviously lower than that of the UE in the core area of the cell, and affects the communication quality of the UE in the edge area of the cell and the UE in the middle area of the cell.

Based on the above, it is found that when component carriers are allocated for the UE in the edge area of the cell and the UE in the middle area of the cell, if the FDM of the UE in the edge area of the cell and the FDM of the UE in the middle area of the cell are increased according to a preset range, the probability of allocating component carriers for the UE in the edge area of the cell and the UE in the middle area of the cell will be increased obviously, thereby improving the data throughput; besides, it is also found that when the component carriers have the same coverage, since the channel fading of a component carrier which has a frequency lower than the preset threshold is relatively low, the UE may require for preferentially allocating the component carrier with good channel condition and low frequency, and different areas of the cell are listed below according to the descending order of amounts of the UEs in different areas of the cell: the core area of the cell, the middle area of the cell and the edge area of the cell. Thus, in the embodiment of the present disclosure, the frequencies of the component carriers covering the core area of the cell, the middle area of the cell and the edge area of the cell increase in order, for example, the component carrier which has a frequency not exceeding the preset threshold is controlled to cover the core area (namely the area which has a distance shorter than or equal to $r_1$ from the base station to which the cell belongs) of the cell, the component carrier which has a frequency higher than the preset threshold is controlled to cover the middle area (namely the area which has a distance longer than $r_1$ and shorter than $r_2$ from the base station to which the cell belongs) of the cell and the edge area (namely the area which has a distance longer than $r_2$ from the base station to which the cell belongs) of the cell; the frequency of the component carrier covering the edge area of the cell is higher than that of the component carrier covering the middle area of the cell.

Besides, since the path loss of the UE in the edge area of the cell and the path loss of the UE in the middle area of the cell are relatively large, in the present embodiment of the present disclosure, the component carriers which have frequencies higher than the preset threshold are transmitted by a high power, so that the component carriers which have frequencies higher than the preset threshold cover the middle area of the cell and the edge area of the cell; since the channel condition of the UE in the core area of the cell is good, and reduction in a transmitting power will not influence the communication quality of the UE, in the present embodiment of the present disclosure, the component carrier which has a frequency not exceeding the preset threshold is transmitted by a low power, so that the component carrier which has a frequency not exceeding the preset threshold covers the core area of the cell.

It should be noted that, since the component carrier is transmitted by the base station to which the cell belongs, the component carrier which has a frequency higher than the preset threshold and which covers the middle area (namely the area which has a distance longer than $r_1$ and shorter than $r_2$ from the base station to which the cell belongs) of the cell also covers the core area (namely the area which has a distance shorter than or equal to $r_1$ from the base station to which the cell belongs) of the cell, and the component carrier which covers the edge area (namely the area which has a distance longer than $r_2$ from the base station to which the cell belongs) of the cell covers the core area and the middle area (namely the area which has a distance shorter than or equal to $r_2$ from the base station to which the cell belongs) of the cell at the same time.

For example, Long Term Evolution-Advanced (LTE-A) deployment frequency bands include: 450-470 MHz, 698-862 MHz, 790-862 MHz, 2.3-2.4 GHz, 3.4-4.2 GHz and 4.4-4.99 GHz.

Correspondingly, in a LTE-A cell, the frequency bands which have frequencies not exceeding 862 MHz in the above frequency bands, namely 450-470 MHz, 698-862 MHz and 790-862 MHz, are controlled; the corresponding component carrier covers the core area of the cell;

the two frequency bands with the lowest frequency, namely 2.3-2.4 GHz and 1-2 GHz, in the frequency bands which have frequencies exceeding the preset threshold 1 GHz are controlled; the corresponding component carrier covers the middle area of the cell, and also covers the core area of the cell correspondingly;

the two frequency bands with the highest frequency, namely 3.4-4.2 GHz and 4.4-4.99 GHz, in the frequency bands which have frequencies exceeding the preset threshold 1 GHz are controlled, and the corresponding component carrier covers the edge area of the cell, namely the whole cell.

FIG. 2 is a distribution diagram of the UEs in the cell according to an embodiment of the present disclosure; by taking the cell in which the UEs are distributed evenly for example, how to use L component carriers to cover the different areas of the cell in the embodiment of the present disclosure is illustrated in combination with FIG. 2; the numbers of the component carriers which cover the core area of the cell, the middle area of the cell and the edge area of the cell are respectively X, Y and Z.

For Z, under the following two conditions: (1) all the L component carriers are allocated for the UEs in the core area of the cell and the middle area of the cell; (2) (L-Z) component carriers obtained by removing Z component carriers from the L component carriers are allocated for the UEs in the core area of the cell and the middle area of the cell, the following is obtained:

$$\frac{1-\lambda}{L} = \frac{\lambda}{Z} \quad (1)$$

$$\frac{1-\lambda}{L-Z} = \frac{\lambda}{Z} \quad (2)$$

the value range of Z obtained from the formulae (1) and (2) is $$\left[ L\left(\frac{9R^2}{2\sqrt{3}\pi r_2^2} - 1\right), L\left(1 - \frac{2\sqrt{3}\pi r_2^2}{9R^2}\right) \right].$$

For Y, under the following two conditions: (1) all the L component carriers are allocated for the UEs in the core area of the cell; (2) (L-Y) component carriers obtained by removing Y component carriers from the L component carriers are allocated for the UEs in the core area of the cell and the edge area of the cell, the following is obtained:

$$\frac{1-\beta-\lambda}{L} = \frac{\beta}{Y} \quad (3)$$

$$\frac{1-\beta-\lambda}{L-Z-Y} = \frac{\beta}{Y} \quad (4)$$

the value range of Y obtained from the formulae (3) and (4) is $$\left( \frac{r_2^2 - r_1^2}{2r_2^2 - r_1^2} L, \frac{(L-Z)(r_2^2 - r_1^2)}{3r_2^2 - 2r_1^2} \right).$$

Through the above value ranges, it can be determined that when there are 20 component carriers covering the cell, 14 component carriers with a frequency lower than the preset threshold cover the core area of the cell, 4 component carriers with a frequency higher than the preset threshold cover the middle area of the cell, and 2 component carriers with a frequency higher than the preset threshold cover the edge area of the cell, that is, the component carriers cover the whole cell.

In the embodiment of the present disclosure, when the coverage of the component carrier is shorter than the preset threshold $r_2$, the FDM of UE which has a distance longer than the preset threshold $r_1$ and shorter than the preset threshold $r_2$ from the base station to which the cell belongs is updated to $a \times FDM_1$, wherein a is greater than 1, and $FDM_1$ is the FDM before update, namely $$\left( 1 + \frac{\sum_{m \in C_k} r_{k,m(t)}}{(T-1)R_k(t)} \right);$$

and the FDM of UE in a distance longer than or equal to the preset threshold $r_2$ from the base station to which the cell belongs is updated to 0.

Here, since it is identified that the component carrier does not cover the edge area of the cell when the coverage radius of the component carrier is shorter than the preset threshold $r_2$, the component carrier cannot be allocated for the UE in the edge area of the cell, namely the UE which has a distance longer than or equal to the preset threshold $r_2$ from the base station to which the cell belongs; correspondingly, the FDM of the UE in the edge area of the cell is set as 0, so that the component carrier will not be allocated for the UE in the edge area of the cell.

In the embodiment of the present disclosure, when the coverage radius of the component carrier is longer than or equal to the preset threshold $r_2$, the FDM of the UE which has a distance longer than the preset threshold $r_1$ and shorter than the preset threshold $r_2$ from the base station to which the cell belongs is updated to $a \times FDM_1$, wherein $FDM_1$ is the FDM before update, namely $$\left( 1 + \frac{\sum_{m \in C_k} r_{k,m(t)}}{(T-1)R_k(t)} \right),$$

and the FDM of the UE which has a distance longer than or equal to the preset threshold $r_2$ from the base station to which the cell belongs is updated to $b \times FDM_2$, wherein b is greater than a.

Here, it is identified that the component carrier covers the edge area of the cell when the coverage radius of the component carrier is longer than or equal to the preset threshold $r_2$; correspondingly, the FDM of the UE in the edge area of the cell and the FDM of the UE in the middle area of the cell are increased, and the FDM of the UE in the edge area of the cell is made higher than the FDM of the UE in the middle area of the cell, so as to increase the probability of allocating the component carriers for the UEs in the edge area of the cell and the middle area of the cell.

Step 102 is that the frequency domain priority is determined according to the updated FDM, and the component carrier which has a frequency exceeding the preset threshold is allocated for the UE in the cell according to the frequency domain priority.

Here, a descending order of the updated FDM is determined as the frequency domain priority of the UE, and the component carrier is allocated for the UE according to a descending order of the priority.

Since the present disclosure uses the low-frequency component carrier (namely the component carrier with a frequency lower than the preset threshold) to cover the core area of the cell, when it is determined that the component carrier which has a frequency not exceeding the preset threshold exists in the component carriers which are available to be allocated currently, the descending order of the determined FDM $$\left(1 + \frac{\sum_{m \in C_k} r_{k,m(t)}}{(T-1)R_k(t)}\right)$$

is determined as the frequency domain priority of the UE, and the component carrier which has a frequency not exceeding the preset threshold is allocated for the UE according to the descending order of the priority.

An embodiment of the present disclosure also provides a computer storage medium, which stores the computer program; the computer program is used for executing the method for component carrier allocation in the above embodiments.

Figure 3:
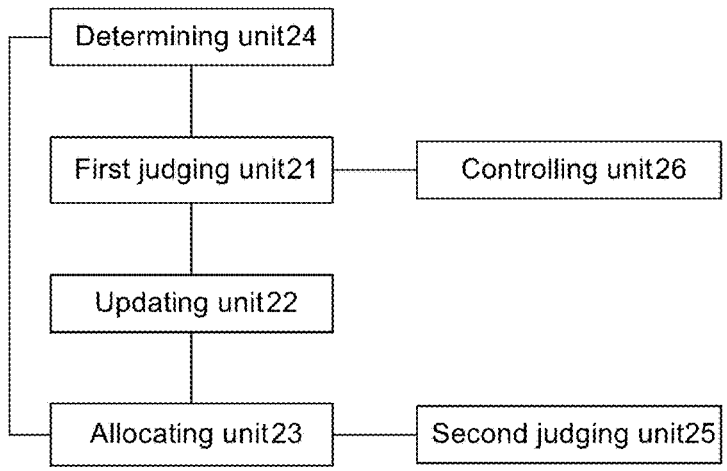
FIG. 3 is a structural diagram of a device for component carrier allocation according to an embodiment of the present disclosure.

An embodiment of the present disclosure also describes a device for component carrier allocation; FIG. 3 is a structural diagram of the device for component carrier allocation according to an embodiment of the present disclosure; as shown in FIG. 3, the device includes the first judging unit 21, the updating unit 22 and the allocating unit 23; wherein, the first judging unit 21 is configured to judge whether a component carrier which has a frequency exceeding a preset threshold exists in component carriers which are available to be allocated currently in the cell;

the updating unit 22 is configured to, when a judging result of the first judging unit is yes, update the FDM of UE in the cell according to the coverage of the component carrier which has a frequency exceeding the preset threshold; and the allocating unit 23 is configured to determine the frequency domain priority according to the FDM determined by the updating unit 22, and allocate the component carrier which has a frequency exceeding the preset threshold for the UE in the cell according to the frequency domain priority.

Preferably, the device further includes:
the determining unit 24, which is configured to, before the first judging unit 21 judges whether the component carrier which has a frequency exceeding the preset threshold exists in the component carriers which are available to be allocated currently in the cell, determine the FDM of the UE in the cell as $$\left(1 + \frac{\sum_{m \in C_k} r_{k,m(t)}}{(T-1)R_k(t)}\right),$$

wherein $C_k$ is the component carrier set allocated for UE k, $R_k(t)$ is the average data transmission rate of the UE k before the time slot t, $r_{k,m}(t)$ is the instantaneous data transmission rate that the UE k reaches on an allocated component carrier m in the time slot t, and T is the measuring window size of the average throughput of the cell.

Preferably, the updating unit 22 is further configured to, when the coverage radius of the component carrier which has a frequency exceeding the preset threshold is greater than or equal to the preset threshold $r_2$, update the FDM of the UE which has a distance longer than the preset threshold $r_1$ and shorter than the preset threshold $r_2$ from the base station to which the cell belongs to $a \times FDM_1$, and update the FDM of the UE which has a distance longer than or equal to the preset threshold $r_2$ from the base station to which the cell belongs to $b \times FDM_2$, wherein $FDM_1$ and $FDM_2$ are the FDM of the UE before update, a is greater than 1, and b is greater than a; and the updating unit 22 is further configured to, when the coverage radius of the component carrier which has a frequency exceeding the preset threshold is shorter than the preset threshold $r_2$, update the FDM of the UE which has a distance longer than the preset threshold $r_1$ and shorter than the preset threshold $r_2$ from the base station to which the cell belongs to $a \times FDM_1$, and update the FDM of the UE which has a distance longer than or equal to the preset threshold $r_2$ from the base station to which the cell belongs to 0, wherein a is greater than 1, and $FDM_1$ is the FDM of the UE before update.

Preferably, the device further includes:
the second judging unit 25, which is configured to judge whether a component carrier which has a frequency not exceeding the preset threshold exists in the component carriers which are available to be allocated currently in the cell;

the allocating unit 23 is further configured to, when a judging result of the second judging unit 25 is yes, determine the frequency domain priority according to the determined FDM $$\left(1 + \frac{\sum_{m \in C_k} r_{k,m(t)}}{(T-1)R_k(t)}\right)$$

of the UE, and allocate the component carrier which has a frequency not exceeding the preset threshold for the UE in the cell according to the frequency domain priority.

Preferably, the device further includes:
the controlling unit 26, which is configured to control a preset number of component carriers in the component carriers which have frequencies exceeding the preset threshold to cover the area having a distance exceeding the preset threshold $r_2$ from the base station to which the cell belongs, and control a preset number of component carriers in the component carriers which have frequencies exceeding the preset threshold to cover the area having a distance longer than the preset threshold $r_1$ and shorter than the preset threshold $r_2$ from the base station to which the cell belongs; and the controlling unit 26 is further configured to control the component carriers which has a frequency not exceeding the preset threshold to cover the area having a distance smaller than or equal to the preset threshold $r_1$ from the base station to which the cell belongs.

In the practical application, all of the first judging unit 21, the updating unit 22, the allocating unit 23, the determining unit 24, the second judging unit 25 and the controlling unit 26 can be implemented by a Central Processing Unit (CPU), a Digital Signal Processor (DSP) or a Field Programmable Gate Array (FPGA).

The present disclosure is further illustrated below by taking an out-of-band non-contiguous CA scenario for example. The diagram of the cell in the present disclosure is shown in FIG. 2; 100 UEs are evenly distributed in the cell, 20 component carriers cover the cell, and the frequencies of the component carriers are {f1, f2, . . . , f20}, wherein f1<f2< . . . <f14<300 KHz<f15 . . . <f20, and each component carrier has the same bandwidth, namely the same number of resource blocks; according to the determined value range $$\left[ L\left( \frac{9R^2}{2\sqrt{3}\pi r_2^2} - 1 \right), L\left( 1 - \frac{2\sqrt{3}\pi r_2^2}{9R^2} \right) \right]$$

of the number of component carriers covering the edge area of the cell and the value range $$\left( \frac{r_2^2 - r_1^2}{2r_2^2 - r_1^2} L, \frac{(L-Z)(r_2^2 - r_1^2)}{3r_2^2 - 2r_1^2} \right)$$

of the number of component carriers covering the middle area of the cell in the embodiment of the present disclosure, 14 low-frequency component carriers which have frequencies not exceeding the preset threshold 300 KHz, namely the component carriers corresponding to f1~f14, are controlled to cover the core area of the cell, the 2 high-frequency component carriers with the highest frequencies in the component carriers which have frequencies exceeding the preset threshold 300 KHz, namely the component carriers corresponding to f19 and f20, are controlled to cover the whole cell, and the rest 4 high-frequency component carriers, namely the component carriers corresponding to f15-f18, are controlled to cover the middle area of the cell; the coverage of the component carrier is achieved by controlling the transmitting power of the component carrier.

Figure 4:
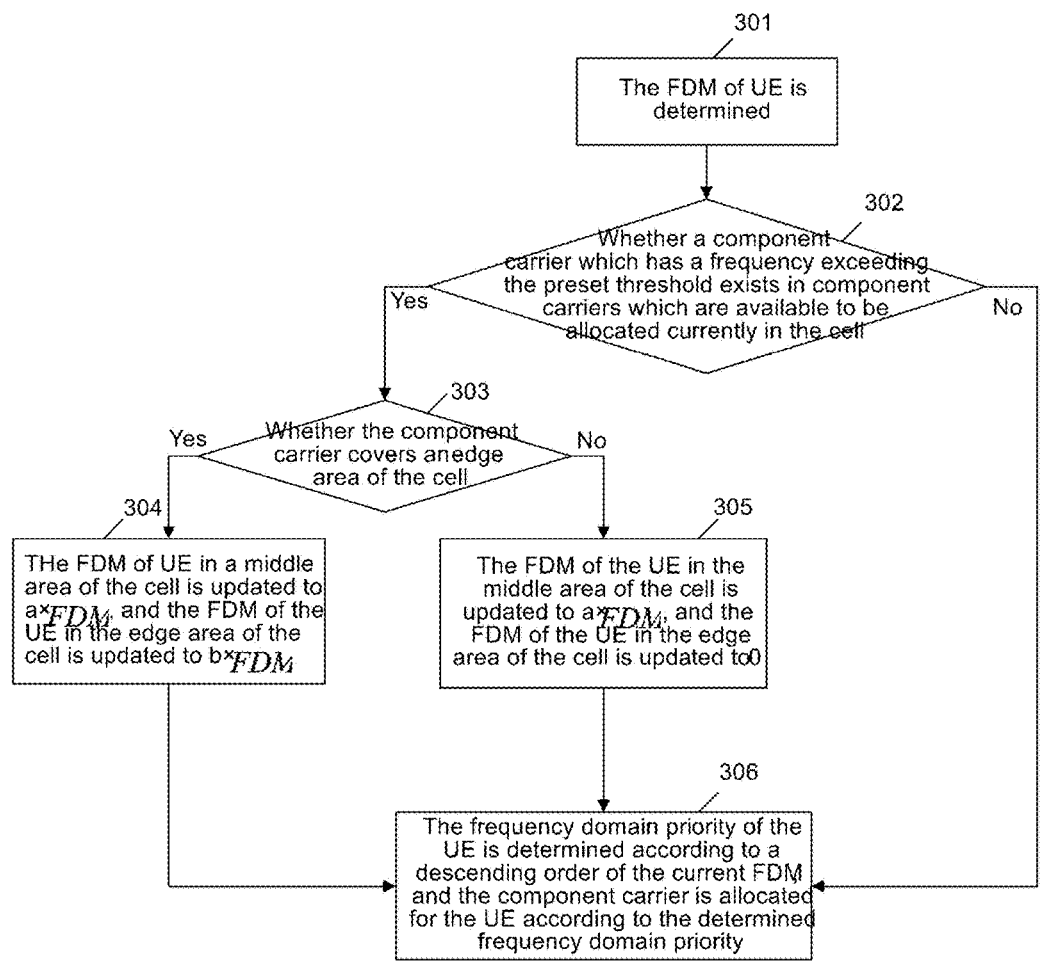
FIG. 4 is a flowchart of implementation of component carrier allocation according to an embodiment of the present disclosure.

Based on the above scenario, FIG. 4 shows a flowchart of implementation of component carrier allocation according to an embodiment of the present disclosure; as shown in FIG. 4, the flow includes the following steps.

Step 301 is that the FDM of UE is determined.

Before Step 301, the TDM of the UE is determined according to the proportional fair allocation policy.

$\gamma_i(n,t)$ is for representing the SNR of UE i on the nth resource block $RB_n$ of the component carrier in the time slot t, then $\gamma_i(n,t)$ is $$\frac{p_k(n)|H_i(n,t)|}{N_0},$$

wherein $p_k(n)$ is the transmitting power of the $RB_n$ on the component carrier k, $H_i(n,t)$ is a composite channel gain of the UE i on the $RB_n$; $N_0$ is a noise power of the UE i on the $RB_n$, and $P_k$ (is the transmitting power of the component carrier k. Thus, the instantaneous speed $r_i(n,t)$ of the UE i on the $RB_n$ in the time slot t is $W \log(1+\beta\gamma_i(n,t))$, wherein W is the bandwidth of the $RB_n$, and β is an SNR gap with a value $[-1.5/\ln(5Pen)][-1.5/\ln(5Pen)]$, wherein Pen is a target bit error rate.

Step 302 is that it is judged whether a component carrier which has a frequency exceeding the preset threshold exists in the component carriers which are available to be allocated currently in the cell; if such a component carrier exists, Step 303 is executed; or else, Step 306 is executed.

Step 303 is that it is judged whether the component carrier covers the edge area of the cell; if the component carrier covers the edge area of the cell, Step 304 is executed; or else, Step 305 is executed.

Step 304 is that the FDM of the UE in the middle area of the cell is updated to $a \times FDM_1$, and the FDM of the UE in the edge area of the cell is updated to $b \times FDM_2$.

The FDM of the UE having a distance longer than the preset threshold $r_1$ and shorter than the preset threshold $r_2$ from the base station to which the cell belongs, namely the FDM of the UE in the middle area of the cell, is updated to $a \times FDM_1$; and the FDM of the UE having a distance longer than or equal to the preset threshold $r_2$ to the base station to which the cell belongs, namely the FDM of the UE in the edge area of the cell, is updated to $b \times FDM_2$, wherein $FDM_1$ and $FDM_2$ are the FDM of the UEs before update, a is greater than 1, and b is greater than a.

Step 305 is that the FDM of the UE in the middle area of the cell is updated to $a \times FDM_1$, and the FDM of the UE in the edge area of the cell is updated to 0.

The FDM of the UE which has a distance longer than the preset threshold $r_1$ and shorter than the preset threshold $r_2$ to the base station to which the cell belongs is updated to $a \times FDM_1$, and the FDM of the UE which has a distance longer than or equal to the preset threshold $r_2$ to the base station to which the cell belongs is updated to 0, wherein a is greater than 1, and $FDM_1$ is the FDM of the UE before update.

Step 306 is that the frequency domain priority of the UE is determined according to the descending order of the current FDM, and the component carrier is allocated for the UE according to the determined frequency domain priority.

Here, the component carrier which is available to be allocated in Step 303 is the one which has a frequency exceeding the preset threshold, that is, the identified component carrier belongs to the set of 14 component carriers with the lowest frequency; since the component carrier is only allocated for the UE in the core area of the cell, Step 306 is executed directly without need of adjusting the FDM of the UE in the middle area of the cell and the edge area of the cell.

Through this embodiment, the following technical effects can be achieved:

the set of the component carriers which are available to be allocated for the UE in the middle area of the cell is {f15, f16, ..., f20}; the component carrier is allocated for each UE according to the descending order of the updated a×FDM$_1$; the 2 component carriers with the highest frequencies, namely the component carriers corresponding to f19 and f20, can be allocated for the UE in the edge area of the cell; the component carrier is allocated for the UE in the edge area of the cell according to the frequency domain priority determined based on the updated b×FDM$_2$; that is, for the component carriers corresponding to f19 and f20, the UE in the edge area of the cell has the highest priority of allocation, the priority of the UE in the middle area of the cell is lower than the highest priority, and the priority of the UE in the core area of the cell is lowest; for the component carriers corresponding to f15~f18, the component carrier cannot be allocated for the UE in the edge area of the cell, the UE in the middle area of the cell has the highest priority of allocation, and the priority of the UE in the core area of the cell is lower than the highest priority; for the component carriers corresponding to f1~f14, the component carriers can only be allocated for the UE in the core area of the cell;

thus, the throughput of the UE in the edge area of the cell can be improved, and the communication quality is guaranteed; besides, the low-frequency component carrier with a relatively good channel condition is controlled in the core area of the cell, thereby guaranteeing the throughput of the cell at a high level.

The above are only the preferred embodiments of the present disclosure and not intended to limit the scope of the claims of the present disclosure.

INDUSTRIAL APPLICABILITY

In the present disclosure, when it is determined that a component carrier which has a frequency exceeding the preset threshold exists in component carries which are available to be allocated currently in the cell, the FDM of UE in the cell is updated according to the coverage of the component carrier which has a frequency exceeding the preset threshold; and the frequency domain priority is determined according to the updated FDM, and the component carrier which has a frequency exceeding the preset threshold is allocated for the UE in the cell according to the frequency domain priority. By adopting the technical solutions of the present disclosure, the problem of poor communication quality of UE moving at a high speed caused by the low fairness of component carrier allocation in the cell can be solved.

What is claimed is:

1. A method for component carrier allocation, comprising:
when it is determined that a component carrier which has a frequency exceeding a preset frequency threshold exists in component carriers which are available to be allocated currently in a cell, updating a Frequency Domain Metric (FDM) of a User Equipment (UE) in the cell according to coverage of the component carrier which has a frequency exceeding the preset frequency threshold; and
determining frequency domain priority according to the updated FDM, and allocating the component carrier which has a frequency exceeding the preset frequency threshold for the UE in the cell according to the determined frequency domain priority,
wherein before it is determined that the component carrier which has a frequency exceeding the preset frequency threshold exists in the component carriers which are available to be allocated currently in the cell, the method further comprising:
determining the FDM of the UE in the cell as $$\left(1 + \frac{\sum_{m \in C_k} r_{k,m(t)}}{(T-1)R_k(t)}\right),$$

wherein $C_k$ is a component carrier set allocated for UE k, $R_k(t)$ is an average data transmission rate of the UE k before a time slot t, $r_{k,m}(t)$ is an instantaneous data transmission rate that the UE k reaches on an allocated component carrier m in the time slot t, and T is a measuring window size of an average throughput of the cell.

2. The method according to claim 1, wherein updating the FDM of the UE in the cell according to the coverage of the component carrier which has a frequency exceeding the preset frequency threshold further comprises:
when a coverage radius of the component carrier which has a frequency exceeding the preset frequency threshold is greater than or equal to a preset distance threshold $r_2$, updating FDM of UE which has a distance longer than a preset distance threshold $r_1$ and shorter than the preset distance threshold $r_2$ from a base station to which the cell belongs to a×FDM$_1$, and updating FDM of UE which has a distance longer than or equal to the preset distance threshold $r_2$ from the base station to which the cell belongs to b×FDM$_2$, wherein FDM$_1$ and FDM$_2$ are the FDM of the UEs before update, a is greater than 1, and b is greater than a;
when the coverage radius of the component carrier which has a frequency exceeding the preset frequency threshold is shorter than the preset distance threshold $r_2$, updating FDM of UE which has a distance longer than the preset distance threshold $r_1$ and shorter than the preset distance threshold $r_2$ from the base station to which the cell belongs to a×FDM$_1$, and updating FDM of UE which has a distance longer than or equal to the preset distance threshold $r_2$ from the base station to which the cell belongs to 0, wherein a is greater than 1, and FDM$_1$ is the FDM of the UE before update.

3. The method according to claim 2, further comprising:
when it is determined that a component carrier which has a frequency not exceeding the preset frequency threshold exists in the component carriers which are available to be allocated currently in the cell, determining frequency domain priority according to the determined FDM $$\left(1 + \frac{\sum_{m \in C_k} r_{k,m(t)}}{(T-1)R_k(t)}\right)$$

of the UE, and allocating the component carrier which has a frequency not exceeding the preset frequency threshold for the UE in the cell according to the determined frequency domain priority.

4. The method according to claim 3, further comprising:
controlling a preset number of component carriers in the component carriers which have frequencies exceeding the preset frequency threshold to cover an area having a distance exceeding a preset distance threshold $r_2$ from the base station to which the cell belongs, and controlling a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs;

controlling the component carrier which has a frequency not exceeding the preset frequency threshold to cover an area having a distance shorter than or equal to the preset distance threshold $r_1$ from the base station to which the cell belongs.

5. The method according to claim 2, further comprising:
controlling a preset number of component carriers in the component carriers which have frequencies exceeding the preset frequency threshold to cover an area having a distance exceeding a preset distance threshold $r_2$ from the base station to which the cell belongs, and controlling a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs;

controlling the component carrier which has a frequency not exceeding the preset frequency threshold to cover an area having a distance shorter than or equal to the preset distance threshold $r_1$ from the base station to which the cell belongs.

6. The method according to claim 1, further comprising:
when it is determined that a component carrier which has a frequency not exceeding the preset frequency threshold exists in the component carriers which are available to be allocated currently in the cell, determining frequency domain priority according to the determined FDM $$\left(1 + \frac{\sum_{m \in C_k} r_{k,m(t)}}{(T-1)R_k(t)}\right)$$

of the UE, and allocating the component carrier which has a frequency not exceeding the preset frequency threshold for the UE in the cell according to the determined frequency domain priority.

7. The method according to claim 6, further comprising:
controlling a preset number of component carriers in the component carriers which have frequencies exceeding the preset frequency threshold to cover an area having a distance exceeding a preset distance threshold $r_2$ from the base station to which the cell belongs, and controlling a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs;

controlling the component carrier which has a frequency not exceeding the preset frequency threshold to cover an area having a distance shorter than or equal to the preset distance threshold $r_1$ from the base station to which the cell belongs.

8. The method according to claim 1, further comprising:
controlling a preset number of component carriers in the component carriers which have frequencies exceeding the preset frequency threshold to cover an area having a distance exceeding a preset distance threshold $r_2$ from the base station to which the cell belongs, and controlling a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs;

controlling the component carrier which has a frequency not exceeding the preset frequency threshold to cover an area having a distance shorter than or equal to the preset distance threshold $r_1$ from the base station to which the cell belongs.

9. The method according to claim 1, wherein updating the FDM of the UE in the cell according to the coverage of the component carrier which has a frequency exceeding the preset frequency threshold comprises:
when a coverage radius of the component carrier which has a frequency exceeding the preset frequency threshold is greater than or equal to a preset distance threshold $r_2$, updating FDM of UE which has a distance longer than a preset distance threshold $r_1$ and shorter than the preset distance threshold $r_2$ from a base station to which the cell belongs to $a \times FDM_1$, and updating FDM of UE which has a distance longer than or equal to the preset distance threshold $r_2$ from the base station to which the cell belongs to $b \times FDM_2$, wherein $FDM_1$ and $FDM_2$ are the FDM of the UEs before update, a is greater than 1, and b is greater than a;

when the coverage radius of the component carrier which has a frequency exceeding the preset frequency threshold is shorter than the preset distance threshold $r_2$, updating FDM of UE which has a distance longer than the preset distance threshold $r_1$ and shorter than the preset distance threshold $r_2$ from the base station to which the cell belongs to $a \times^{FDM}_1$, and updating FDM of UE which has a distance longer than or equal to the preset distance threshold $r_2$ from the base station to which the cell belongs to 0, wherein a is greater than 1, and $FDM_1$ is the FDM of the UE before update.

10. The method according to claim 9, further comprising:
when it is determined that a component carrier which has a frequency not exceeding the preset frequency threshold exists in the component carriers which are available to be allocated currently in the cell, determining frequency domain priority according to the determined FDM $$\left(1 + \frac{\sum_{m \in C_k} r_{k,m(t)}}{(T-1)R_k(t)}\right)$$

of the UE, and allocating the component carrier which has a frequency not exceeding the preset frequency threshold for the UE in the cell according to the determined frequency domain priority.

11. The method according to claim 10, further comprising:
controlling a preset number of component carriers in the component carriers which have frequencies exceeding the preset frequency threshold to cover an area having a distance exceeding a preset distance threshold $r_2$ from the base station to which the cell belongs, and controlling a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs;

controlling the component carrier which has a frequency not exceeding the preset frequency threshold to cover an area having a distance shorter than or equal to the preset distance threshold $r_1$ from the base station to which the cell belongs.

12. The method according to claim 9, further comprising:

controlling a preset number of component carriers in the component carriers which have frequencies exceeding the preset frequency threshold to cover an area having a distance exceeding a preset distance threshold $r_2$ from the base station to which the cell belongs, and controlling a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs;

controlling the component carrier which has a frequency not exceeding the preset frequency threshold to cover an area having a distance shorter than or equal to the preset distance threshold $r_1$ from the base station to which the cell belongs.

13. A device for component carrier allocation, comprising:

a memory storing programming instructions; and a processor arranged to execute the stored programming instructions to:

judge whether a component carrier which has a frequency exceeding a preset frequency threshold exists in component carriers which are available to be allocated currently in a cell;

when a judging result is yes, update a Frequency Domain Metric (FDM) of a User Equipment (UE) in the cell according to coverage of the component carrier which has a frequency exceeding the preset frequency threshold; and determine frequency domain priority according to the determined FDM, and allocate the component carrier which has a frequency exceeding the preset frequency threshold for the UE in the cell according to the determined frequency domain priority, wherein the processor is further arranged to:

before it is judged whether the component carrier which has a frequency exceeding the preset frequency threshold exists in the component carriers which are available to be allocated currently in the cell, determine the FDM of the UE in the cell as $$\left(1 + \frac{\sum_{m \in C_k} r_{k,m(t)}}{(T-1)R_k(t)}\right),$$

wherein $C_k$ is a component carrier set allocated for UE k, $R_k(t)$ is an average data transmission rate of the UE k before a time slot t, $r_{k,m}(t)$ is an instantaneous data transmission rate that the UE k reaches on an allocated component carrier m in the time slot t, and T is a measuring window size of an average throughput of the cell.

14. The device for component carrier allocation according to claim 13, wherein the processor is arranged to executed the stored programming instructions to:

when a coverage radius of the component carrier which has a frequency exceeding the preset frequency threshold is greater than or equal to a preset distance threshold $r_2$, update FDM of UE which has a distance longer than the preset distance threshold $r_1$ and shorter than the preset distance threshold $r_2$ from a base station to which the cell belongs to a×$FDM_1$, and update FDM of UE which has a distance longer than or equal to the preset distance threshold $r_2$ from the base station to which the cell belongs to b×$FDM_2$, wherein $FDM_1$ and $FDM_2$ are the FDM of the UEs before update, a is greater than 1, and b is greater than a; and when the coverage radius of the component carrier which has a frequency exceeding the preset frequency threshold is shorter than the preset distance threshold $r_2$, update FDM of UE which has a distance longer than the preset distance threshold $r_1$ and shorter than the preset distance threshold $r_2$ from the base station to which the cell belongs to a×$FDM_1$, and update FDM of UE which has a distance longer than or equal to the preset distance threshold $r_2$ from the base station to which the cell belongs to 0, wherein a is greater than 1, and $FDM_1$ is the FDM of the UE before update.

15. The device for component carrier allocation according to claim 13, the processor is further arranged to execute the stored programming instructions to:

judge whether a component carrier which has a frequency not exceeding the preset frequency threshold exists in the component carriers which are available to be allocated currently in the cell; and when a judging result is yes, determine frequency domain priority according to the determined FDM $$\left(1 + \frac{\sum_{m \in C_k} r_{k,m(t)}}{(T-1)R_k(t)}\right)$$

of the UE, and allocate the component carrier which has a frequency not exceeding the preset frequency threshold for the UE in the cell according to the determined frequency domain priority.

16. The device for component carrier allocation according to claim 13, the processor is further arranged to execute the stored programming instructions to:

control a preset number of component carriers in the component carriers which have frequencies exceeding the preset frequency threshold to cover an area having a distance exceeding the preset distance threshold $r_2$ from the base station to which the cell belongs, and control a preset number of component carriers in the component carriers which have frequencies exceeding the preset frequency threshold to cover an area having a distance longer than the preset distance threshold $r_1$ and shorter than the preset distance threshold $r_2$ from the base station to which the cell belongs; and control the component carrier which has a frequency not exceeding the preset frequency threshold to cover an area having a distance shorter than or equal to the preset distance threshold $r_1$ from the base station to which the cell belongs.

17. A non-transitory computer storage medium, storing a computer program for executing steps of:

when it is determined that a component carrier which has a frequency exceeding a preset frequency threshold exists in component carriers which are available to be allocated currently in a cell, updating a Frequency Domain Metric (FDM) of a User Equipment (UE) in the cell according to coverage of the component carrier which has a frequency exceeding the preset frequency threshold; and determining frequency domain priority according to the updated FDM, and allocating the component carrier which has a frequency exceeding the preset frequency threshold for the UE in the cell according to the determined frequency domain priority wherein before it is determined that the component carrier which has a frequency exceeding the preset frequency threshold exists in the component carriers which are available to be allocated currently in the cell, the method further comprising:

determining the FDM of the UE in the cell as $$\left(1 + \frac{\sum_{m \in C_k} r_{k,m(t)}}{(T-1)R_k(t)}\right),$$

wherein $C_k$ is a component carrier set allocated for UE k, $R_k(t)$ is an average data transmission rate of the UE k before a time slot t, $r_{k,m}(t)$ is an instantaneous data transmission rate that the UE k reaches on an allocated component carrier m in the time slot t, and T is a measuring window size of an average throughput of the cell.

* * * * *